(12) United States Patent
Nagahashi et al.

(10) Patent No.: US 12,136,279 B2
(45) Date of Patent: Nov. 5, 2024

(54) DROWSINESS DETECTION DEVICE

(71) Applicant: YAZAKI CORPORATION, Tokyo (JP)

(72) Inventors: Kenichi Nagahashi, Susono (JP); Jungang Guan, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 18/503,024

(22) Filed: Nov. 6, 2023

(65) Prior Publication Data
US 2024/0193967 A1    Jun. 13, 2024

(30) Foreign Application Priority Data
Dec. 12, 2022 (JP) ................. 2022-197907

(51) Int. Cl.
*G06V 20/59* (2022.01)
*G06V 40/16* (2022.01)
*G06V 40/19* (2022.01)

(52) U.S. Cl.
CPC .......... *G06V 20/597* (2022.01); *G06V 40/166* (2022.01); *G06V 40/19* (2022.01)

(58) Field of Classification Search
CPC ..... G06V 20/597; G06V 40/166; G06V 40/19
See application file for complete search history.

(56) References Cited

U.S. PATENT DOCUMENTS

2020/0286358 A1*  9/2020  Doi .................. B60R 11/04
2021/0241011 A1*  8/2021  Cronje .............. G06T 7/70

FOREIGN PATENT DOCUMENTS

JP    H10-40481 A     2/1998
JP    2022-42248 A    3/2022

* cited by examiner

*Primary Examiner* — Dhaval V Patel
(74) *Attorney, Agent, or Firm* — KENEALY VAIDYA LLP

(57) ABSTRACT

A drowsiness detection device includes, an imaging unit, a PERCLOS calculation unit, a drowsiness detection unit, and a threshold value setting unit. The PERCLOS calculation unit calculates, based on an image imaged by a camera, a PERCLOS that is a time period ratio during which a driver closes the eye within a certain time period. The drowsiness detection unit detects drowsiness of the driver when the PERCLOS is equal to or larger than a threshold value. When an initial PERCLOS first calculated from a start of driving is less than a %, the threshold value setting unit sets the threshold value to be smaller than in a case that the initial PERCLOS is equal to or larger than a %.

5 Claims, 7 Drawing Sheets

DROWSINESS DETECTION DEVICE

CROSS-REFERENCE TO RELATED APPLICATIONS

This application is based on and claims priority under 35 USC 119 from Japanese Patent Application No. 2022-197907 filed on Dec. 12, 2022, the contents of which are incorporated herein by reference.

TECHNICAL FIELD

The present invention relates to a drowsiness detection device and a drowsiness detection method.

BACKGROUND ART

One of indices for measuring a fatigue degree of a driver of a vehicle such as an automatic vehicle is percent of eye lid closure (PERCLOS) (Patent Literature 1). PERCLOS is a time period ratio during which the driver closes an eye per minute. When PERCLOS is equal to or larger than a threshold value, drowsiness can be detected. However, there is a problem that there is a personal difference in PERCLOS when the driver feels drowsiness, and if the threshold value is uniformly set, it is difficult to accurately detect drowsiness.

Therefore, it is conceivable to make the threshold value to be optionally changeable by the driver by applying a technique described in Patent Literature 2. However, when the driver changes the threshold value, it is necessary to confirm the past PERCLOS history and threshold value, and the threshold value may not be changed due to an annoyance or may not be set to an appropriate threshold value.

CITATION LIST

Patent Literature

Patent Literature 1: JP2022-42248A
Patent Literature 2: JPH10-40481A

SUMMARY OF INVENTION

The present invention has been made in view of the above circumstances, and an object thereof is to provide a drowsiness detection device and a drowsiness detection method capable of improving detection accuracy of drowsiness.

In order to implement the above object, a drowsiness detection device according to the present invention has the following features.

In order to implement the above object, a drowsiness detection method according to the present invention has the following features.

According to the present invention, it is possible to provide a drowsiness detection device and a drowsiness detection method capable of improving detection accuracy of drowsiness.

The present invention has been briefly described above. Further, details of the present invention can be clarified by reading aspects for carrying out the invention (hereinafter, referred to as "embodiments") described below with reference to the accompanying drawings.

DESCRIPTION OF EMBODIMENTS

Specific embodiments according to the present invention will be described below with reference to the drawings.

First Embodiment

Figure 1:
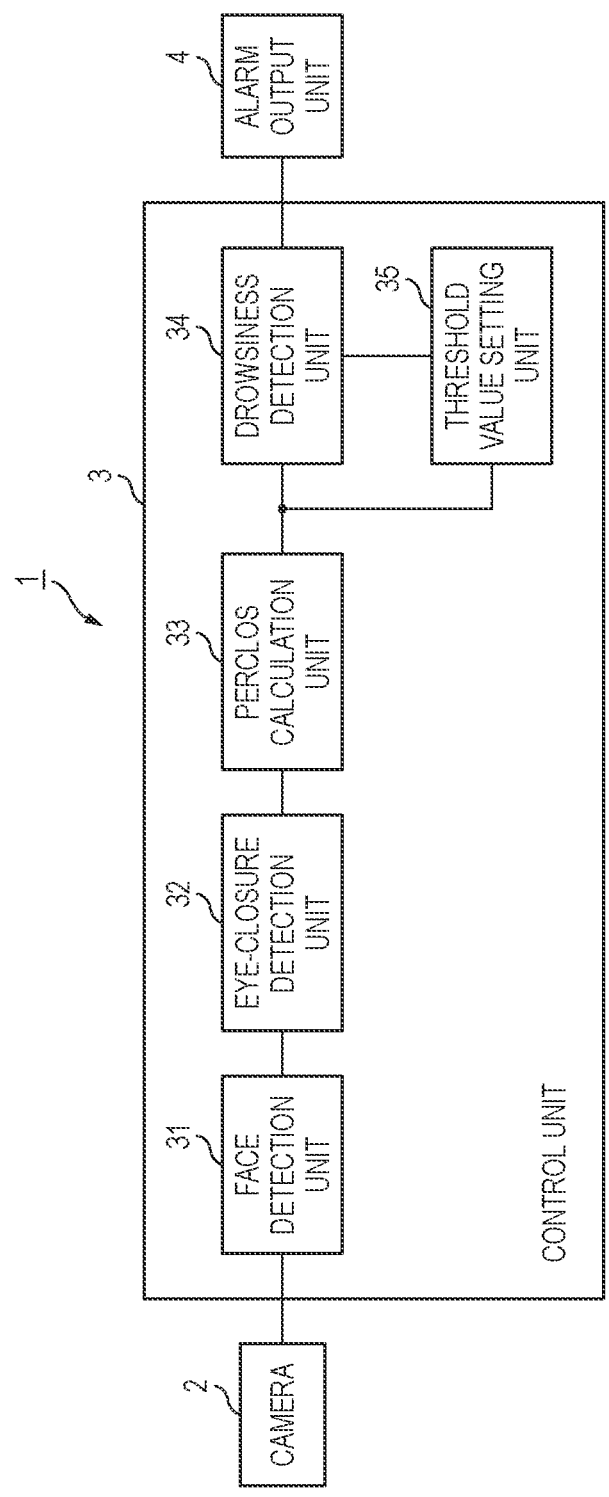
FIG. 1 is a block diagram illustrating a drowsiness detection device according to a first embodiment of the present invention.

A drowsiness detection device 1 according to the present embodiment illustrated in FIG. 1 is a device that is mounted in a vehicle and detects drowsiness of a driver who is a detection target person sitting in a driver seat. As illustrated in FIG. 1, the drowsiness detection device 1 includes a camera 2 serving as an imaging unit, a control unit 3, and an alarm output unit 4.

The camera 2 is installed in a meter unit in front of the driver seat or is installed at a column cover in a manner that a face of the driver sitting in the driver seat can be imaged. The camera 2 provides an imaged image of the face of the driver to the control unit 3 described later.

The control unit 3 includes a well-known microcomputer including a central processing unit (CPU), a read only memory (ROM), a random access memory (RAM), and the like, and functions as a computer that operates according to a drowsiness detection method or program. The control unit 3 includes a face detection unit 31, an eye-closure detection unit 32, a PERCLOS calculation unit 33 serving as a first calculation unit, a drowsiness detection unit 34, and a threshold value setting unit 35.

Figure 2:
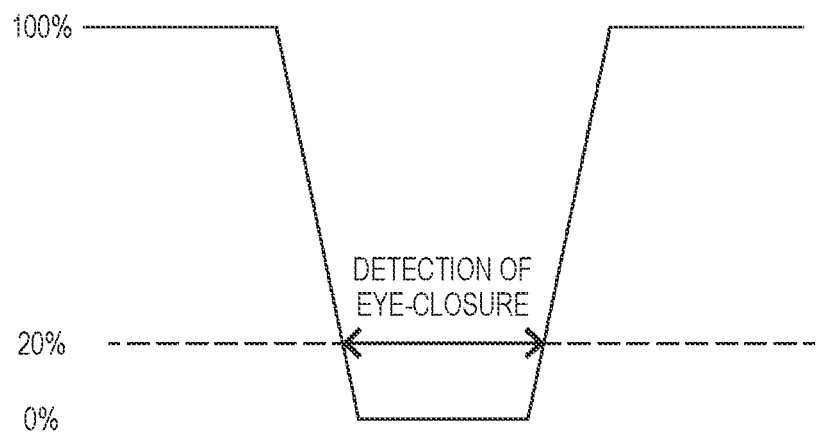
FIG. 2 is a time chart illustrating a function of an eye-closure detection unit illustrated in FIG. 1.

The face detection unit 31 extracts a face image from the image imaged by the camera 2. The eye-closure detection unit 32 obtains an opening/closing degree of an eye from the face image detected by the face detection unit 31, and detects eye-closure from the opening/closing degree. In the present embodiment, as illustrated in FIG. 2, when specifying that the opening/closing degree of 100% is fully opened and the opening/closing degree of 0% is fully closed, the eye-closure is detected when the opening/closing degree becomes a certain value (for example, 20%) or less, and the detection result is provided to the PERCLOS calculation unit 33.

Figure 3:
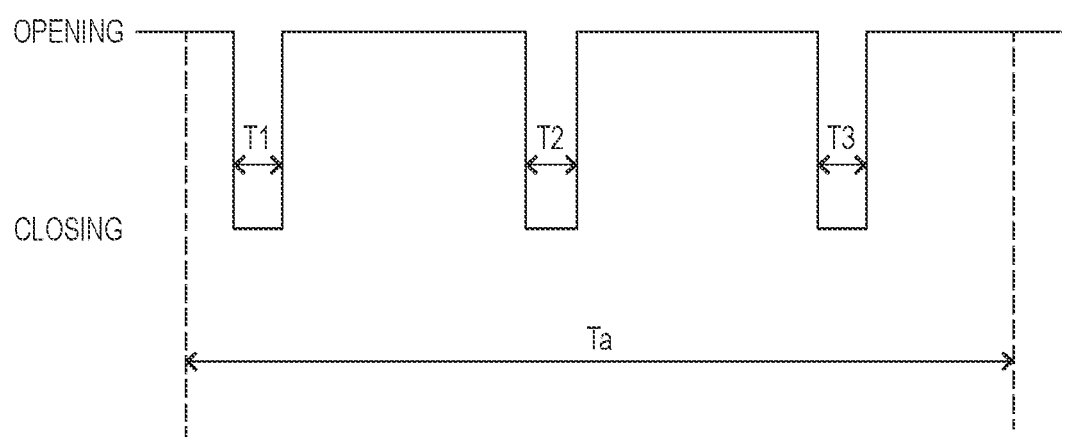
FIG. 3 is a time chart illustrating a function of a PERCLOS calculation unit illustrated in FIG. 1.

As illustrated in FIG. 3, the PERCLOS calculation unit 33 calculates, based on the detection result of the eye-closure from the eye-closure detection unit 32, a PERCLOS expressed by the following equation (1) as a drowsiness index value.

$$PERCLOS = (T1+T2+T3)/Ta \times 100\% \quad (1)$$

PERCLOS is a ratio of a time period (T1+T2+T3) during which the driver closes the eye within a certain time period Ta (=a first predetermined time period). The PERCLOS calculation unit 33 calculates the PERCLOS every certain time period Ta.

The drowsiness detection unit 34 detects drowsiness of the driver when the PERCLOS is equal to or larger than a threshold value, and causes the alarm output unit 4 to generate an alarm. The threshold value setting unit 35 sets the threshold value based on an initial PERCLOS calculated with a first certain time period Ta after a start of driving is detected (after a predetermined trigger).

The alarm output unit 4 includes an indicator such as a meter display, a navigation monitor, or a head-up display, and notifies the driver that drowsiness is detected or a rest is recommended by sound, voice, characters, icons, or the like.

Next, operations of the drowsiness detection device 1 described above will be described with reference to a flowchart illustrated in FIG. 4. First, when the start of driving is detected, the control unit 3 resets the threshold value used for the drowsiness detection described above (that is, makes an initial state). The control unit 3 detects the start of driving when an ignition switch is turned on, for example.

Figure 4:
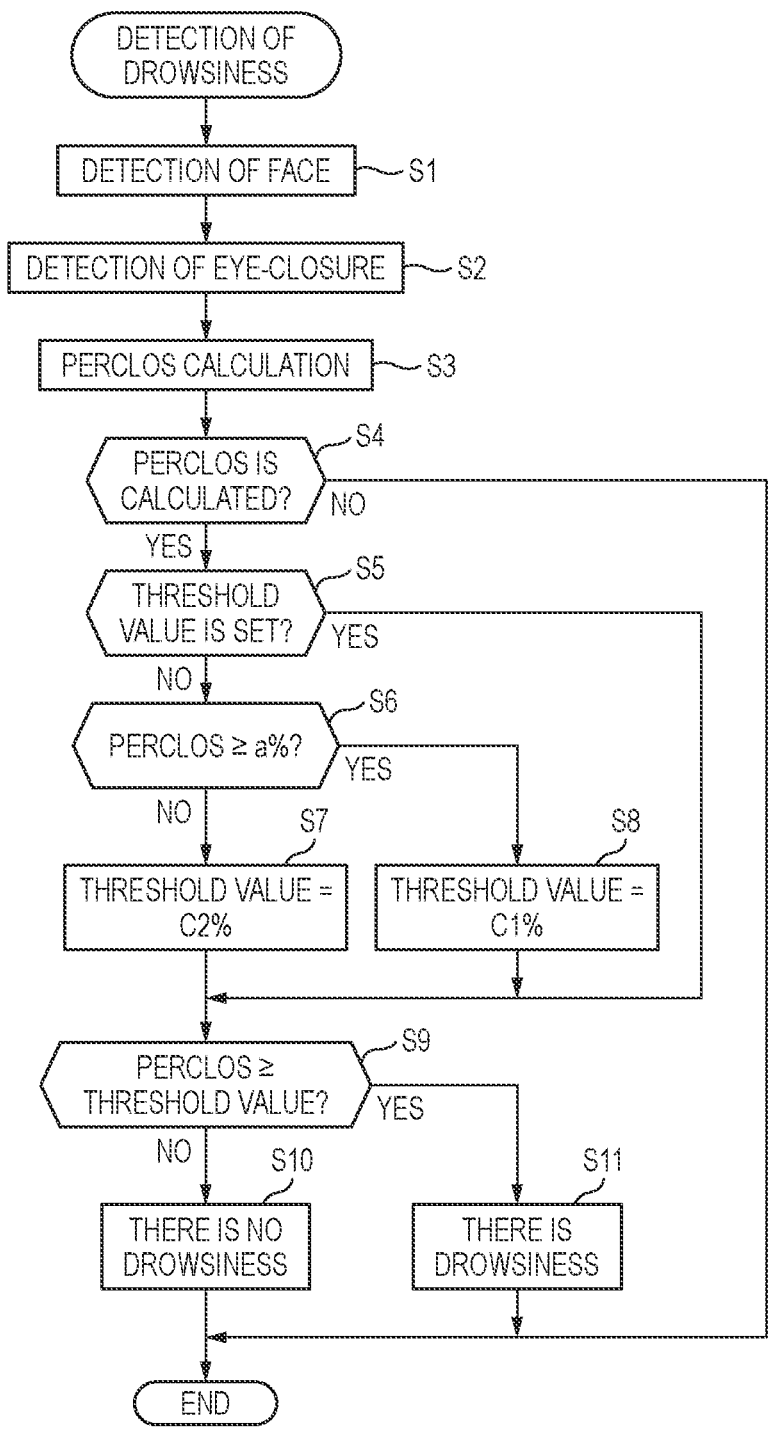
FIG. 4 is a flowchart illustrating operations of the drowsiness detection device illustrated in FIG. 1.

The control unit 3 repeatedly performs the drowsiness detection processing illustrated in FIG. 4 each time an image of one frame imaged by the camera 2 is provided. In the drowsiness detection processing, the control unit 3 extracts the face image from the imaged image from the camera 2 (S1). Next, the control unit 3 obtains the opening/closing degree of the eye from the face image detected by the face detection unit 31, and detects the eye-closure based on the opening/closing degree (S2). Next, when the eye-closure is detected in S2, the control unit 3 counts up a time period during which the driver closes the eye, and calculates the PERCOLS based on the time period counted up when the certain time period Ta elapses (S3).

In a case in which the certain time period Ta does not elapses and the PERCLOS is not calculated (N in S4), the control unit 3 ends the processing. In a case in which the certain time period Ta elapses and the PERCLOS is calculated (Y in S4), the control unit 3 determines whether the threshold value is set (S5). In a case in which the threshold value is set (Y in S5), the control unit 3 proceeds to S9 immediately.

In a case in which the threshold value is not set (N in S5), the control unit 3 determines whether the calculated PERCLOS is equal to or larger than a % (a predetermined value) (S6). The PERCLOS calculated in S3 in a state in which the threshold value is not set is the initial PERCLOS calculated first after the start of driving is detected.

In a case in which the initial PERCLOS is equal to or larger than a % (Y in S6), the control unit 3 sets the threshold value to C1% (S8), and then proceeds to S9. In a case in which the initial PERCLOS is less than a % (N in S6), the control unit 3 sets the threshold value to C2% which is smaller than C1% (S7), and then proceeds to S9.

In S9, in a case in which the PERCLOS calculated in S3 is equal to or larger than the threshold value (Y in S9), the control unit 3 determines that there is drowsiness (S11), controls the alarm output unit 4 to generate an alarm, and then ends the processing. In a case in which the PERCLOS calculated in S3 is less than the threshold value (N in S9), the control unit 3 determines that there is no drowsiness (S10), and ends the processing.

Figure 5:
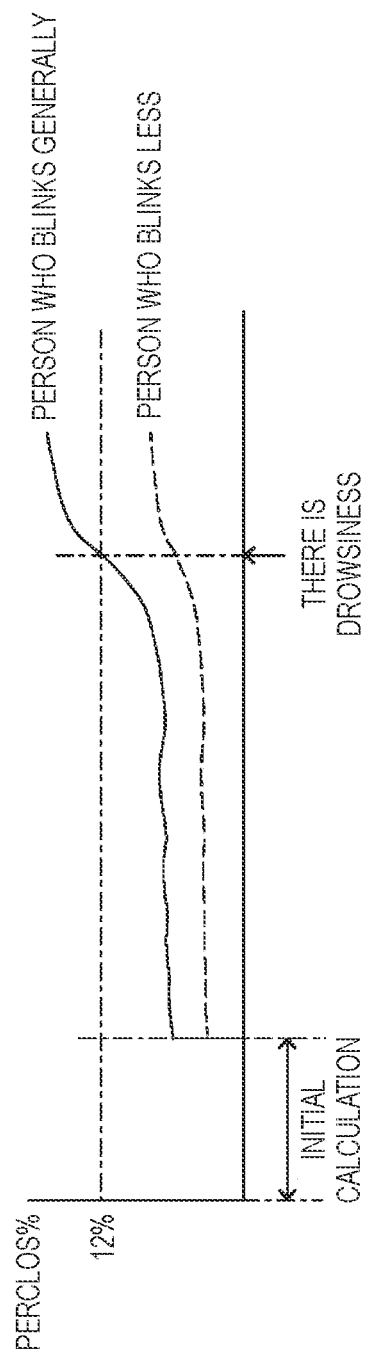
FIG. 5 is a time chart illustrating PERCLOS of a person who blinks generally and a person who blinks less.

As illustrated in FIG. 5, even if the number of times of blinking of a person who blinks less is slightly increased when becomes drowsy, the PERCLOS does not increase too much compared with a person who blinks generally. If the threshold value is uniformly set to, for example, 12% as in the related art, it is impossible to detect drowsiness of the person who blinks less.

Figure 6:
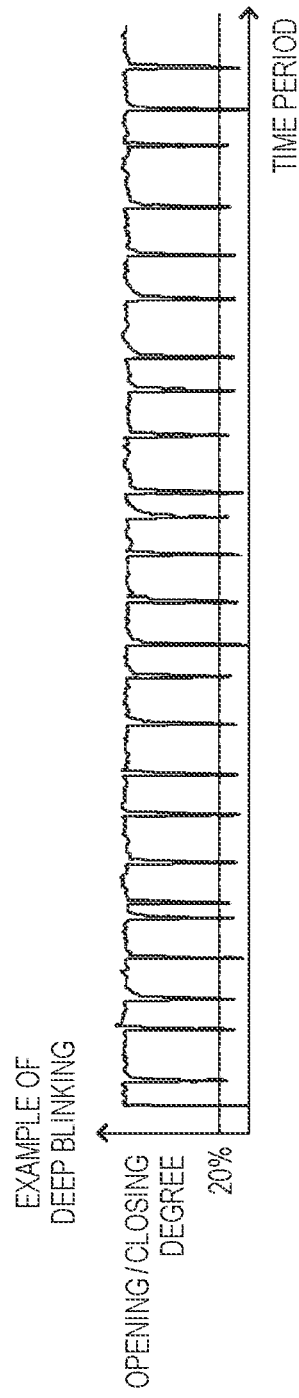
FIG. 6 is a time chart illustrating opening and closing of an eye of a person who performs deep blinking.
Figure 7:
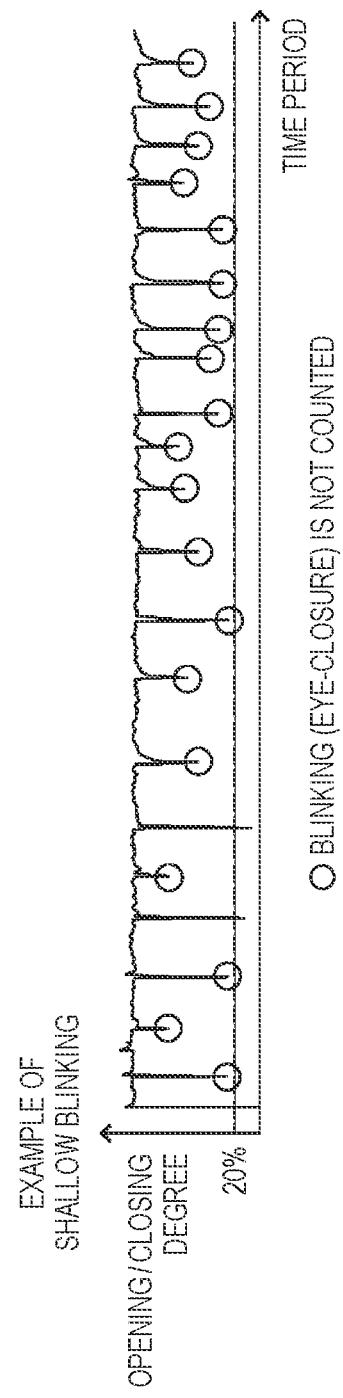
FIG. 7 is a time chart illustrating opening and closing of an eye of a person who performs shallow blinking.

According to the embodiment described above, the control unit 3 sets the threshold value to be smaller in a case in which the initial PERCLOS is less than a % than in a case in which the initial PERCLOS is equal to or larger than a % (C1>C2). That is, as illustrated in FIG. 6, a person who performs deep blinking is high in PERCLOS, and as illustrated in FIG. 7, a person who performs shallow blinking is low in PERCLOS and the eye-closure cannot be detected. Therefore, the person who has a small number of times of blinking or performs shallow blinking has an initial PERCLOS that is less than a %, and thus the threshold value can be set to be smaller than the threshold value corresponding to the person who blinks generally. Accordingly, the threshold value suitable for the driver can be set, and the detection accuracy of drowsiness can be improved.

According to the embodiment described above, the detection of the start of the driving is the predetermined trigger. Accordingly, the threshold value can be determined based on an initial drowsiness index value close to that in the case of awakening, and the detection accuracy of drowsiness can be further improved.

Second Embodiment

Figure 8:
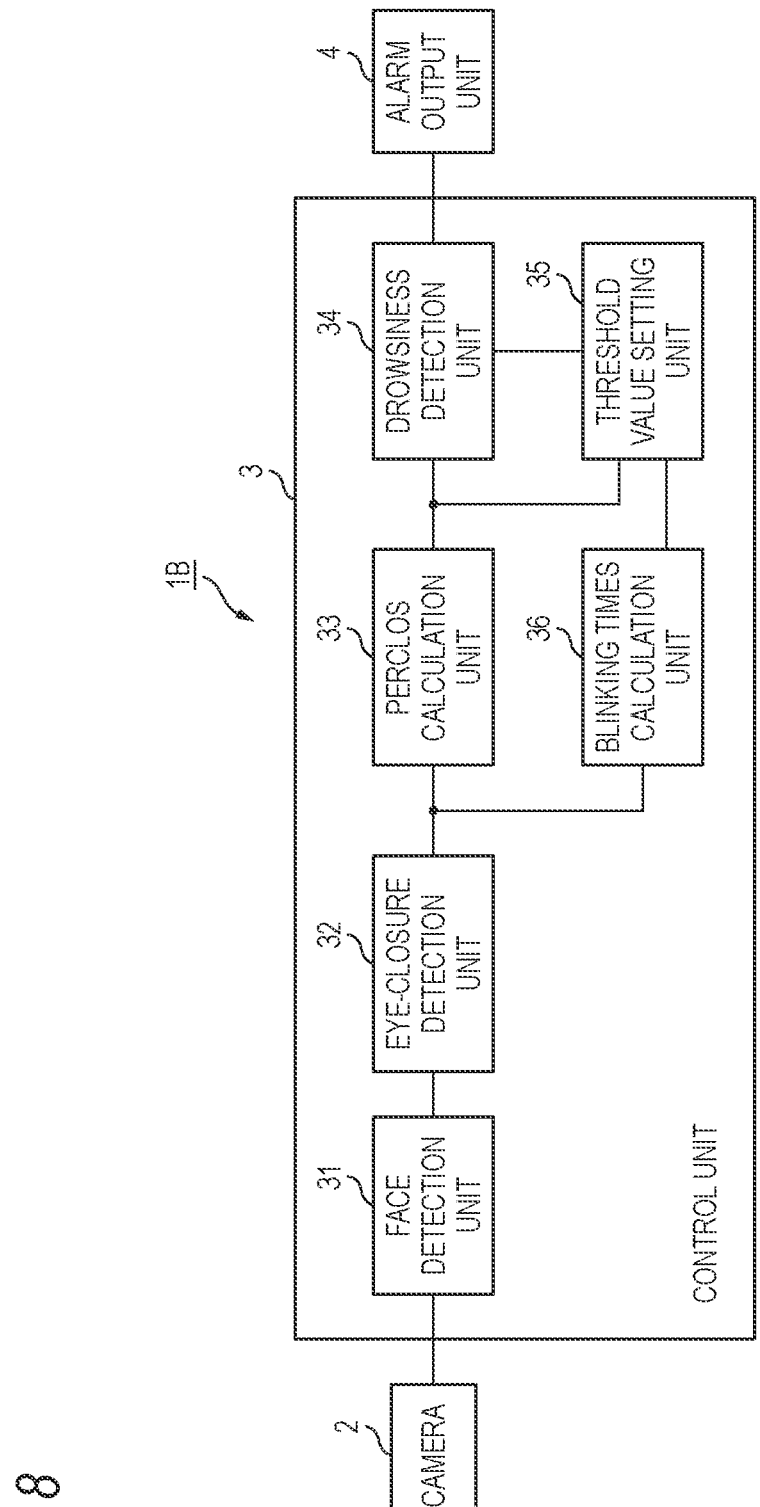
FIG. 8 is a block diagram illustrating a drowsiness detection device according to a second embodiment of the present invention.

Next, a drowsiness detection device 1B according to a second embodiment will be described with reference to FIG. 8. In FIG. 8, portions equivalent to those of the drowsiness detection device 1 illustrated in FIG. 1 already described in the first embodiment are denoted by the same reference numerals, and detailed descriptions thereof are omitted. The drowsiness detection device 1B according to the second embodiment differs from the drowsiness detection device 1 according to the first embodiment in that the control unit 3 includes a blinking times calculation unit 36. The blinking times calculation unit 36 counts (calculates) the number of times of blinking of the driver within the certain time period Ta (a second predetermined time period) based on a detection result of the eye-closure detection unit 32. The threshold value setting unit 35 sets a threshold value based on a PERCLOS and the number of times of blinking calculated with a first certain time period Ta after a start of driving.

Figure 9:
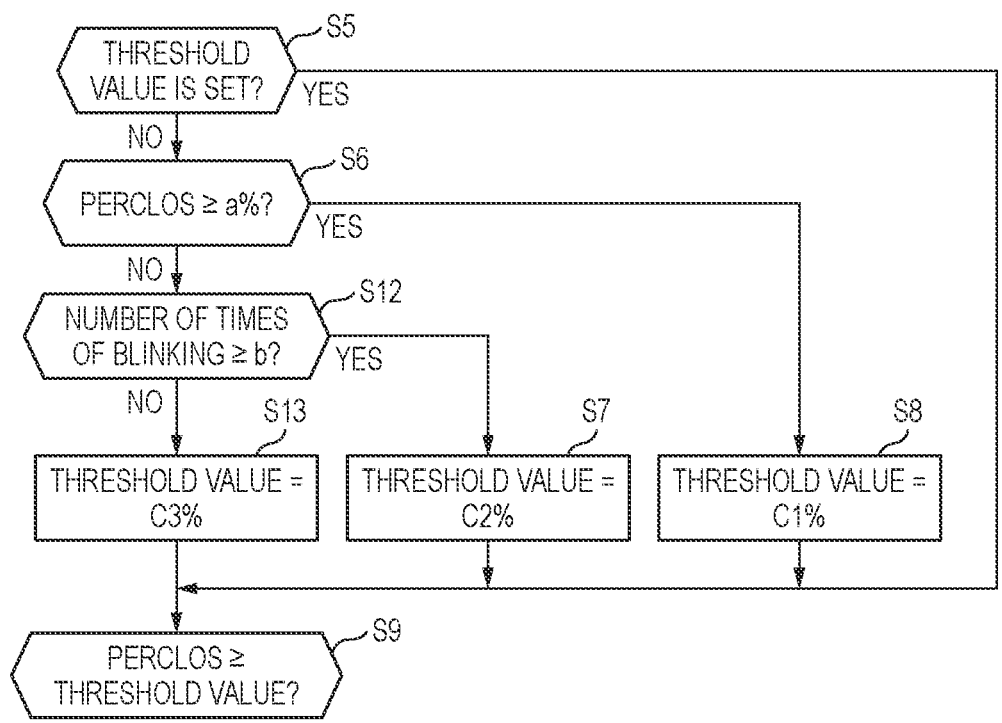
FIG. 9 is a flowchart illustrating operations of the drowsiness detection device illustrated in FIG. 8.

Next, operations of the drowsiness detection device 1B according to the second embodiment will be described with reference to a flowchart illustrated in FIG. 9. In FIG. 9, steps of performing the same operations as those of the flowchart illustrated in FIG. 4 already described in the first embodiment are omitted, and the detailed descriptions thereof are omitted.

In drowsiness detection processing, the control unit 3 performs operations of S1 to S6 as in the first embodiment. In S6, the control unit 3 determines whether an initial PERCLOS is equal to or larger than a % (a predetermined value) (S6). In a case in which the initial PERCLOS is equal to or larger than a % (Y in S6), the control unit 3 sets the threshold value to C1% (S8), and then proceeds to S9. In a case in which the initial PERCLOS is less than a % (N in S6), the control unit 3 determines whether the number of times of blinking calculated within the certain time period Ta is equal to or larger than b (a predetermined number of times) (S12).

In a case in which the number of times of blinking is equal to or larger than b (Y in S12), the control unit 3 sets the threshold value to C2% which is smaller than C1% (S7), and then proceeds to S9. In a case in which the number of times of blinking is less than b (N in S12), the control unit 3 sets the threshold value to C3% which is smaller than C2% (S13), and then proceeds to S9. S9 and subsequent steps are the same as those in the first embodiment, and thus descriptions thereof are omitted.

For a person whose number of times of blinking is counted to some extent, the PERCLOS increases slightly when drowsiness becomes strong, but for a person whose number of times of blinking is hardly counted, the PERCLOS does not increase too much even when drowsiness becomes strong.

According to the embodiments described above, the control unit 3 sets the threshold value to be smaller in a case in which the initial PERCLOS is less than a % and the initial number of times of blinking is less than b than in a case in which the initial PERCLOS is less than a % and the initial number of times of blinking is equal to or larger than b (C2>C3). Accordingly, a person who has a small number of times of blinking belongs to those whose number of times of blinking is less than b, and the threshold value can be set to be smaller as compared with a person who has a large number of times of blinking. Accordingly, the detection accuracy of drowsiness can be further improved. C2 and C3 may be obtained with the following equation by using the PERCLOS ($\alpha$) and the number of times of blinking ($\beta$) as parameters.

$$\text{Threshold value} = n/(\alpha \times Ta/\beta) \quad (2)$$

Next, in order to confirm effects of the first and second embodiments, the present inventors measured the initial PERCLOS twice for each of subjects A to E (detection target persons), a drowsiness level when drowsiness becomes strong was obtained by self-reporting, and threshold values and detections results of a related drowsiness detection device, the drowsiness detection device 1 according to the first embodiment, and the drowsiness detection device 1B according to the second embodiment were summarized in Table 1 below.

the detection accuracy of drowsiness was improved. It was found that, with the drowsiness detection device 1B according to the second embodiment, drowsiness could be detected at the first and second times of the subject C and the second time of the subject D, and the detection accuracy of drowsiness was further improved. It was found that, when using the equation (2) and n=0.3, the detection results of the first and second times of the subject C and the first and second times of the subject D were as follows: the threshold value of the first time of the subject C was 0.3÷(0.2%×180 seconds÷4 times)=3.3, the threshold value of the second time of the subject C was 4.6, the threshold value of the first time of the subject D was 1.8, and the threshold value of the second time of the subject D could not be calculated and if a smaller limit value (for example, 3) was set, a detection rate was 90% to 100%, and thus the accuracy was improved.

The present invention is not limited to the embodiments described above and can be appropriately modified, improved and the like. In addition, materials, shapes, sizes, numbers, arrangement positions and the like of components in the embodiments described above are freely selected and are not limited as long as the present invention can be implemented.

According to the embodiments described above, a time period ratio % during which the driver closes the eye within the certain time period Ta is calculated as the drowsiness index value, but the present invention is not limited thereto. A time period product during which the driver closes the eye within the certain time period Ta may be calculated as the drowsiness index value.

According to the embodiments described above, the control unit 3 detects the start of driving when the ignition switch is turned on, and resets the threshold value of the drowsiness detection, but the present invention is not limited thereto. For example, there is also a case in which the driver is replaced while the engine is applied, and thus when a reset operation (the predetermined trigger) of the driver is per-

TABLE 1

| | Initial | | | | | | | | |
|---|---|---|---|---|---|---|---|---|---|
| Subject | PERCLOS | Number of times of blinking | Related Threshold value | First Threshold value | Second Threshold value | When drowsy PERCLOS | Related | First | Second |
| A1 | 4.9 | — | 12% | 12% | 12% | 37.1 | ○ | ○ | ○ |
| A2 | 6.2 | — | 12% | 12% | 12% | 30.1 | ○ | ○ | ○ |
| B1 | 6.5 | — | 12% | 12% | 12% | 12.4 | ○ | ○ | ○ |
| B2 | 14.0 | — | 12% | 12% | 12% | 25.6 | ○ | ○ | ○ |
| C1 | 0.2 | 4 | 12% | 5% | 3% | 3.3 | x | x | ○ |
| C2 | 0.9 | 25 | 12% | 5% | 5% | 6.7 | x | ○ | ○ |
| D1 | 1.0 | 11 | 12% | 5% | 3% | 2.3 | x | x | x |
| D2 | 0.0 | 0 | 12% | 5% | 3% | 3.6 | x | x | ○ |
| E1 | 2.8 | — | 12% | 12% | 12% | 16.9 | ○ | ○ | ○ |
| E2 | 4.5 | — | 12% | 12% | 12% | 17.2 | ○ | ○ | ○ |
| | | | | | | Detection rate | 60% | 70% | 90% |

In the example illustrated in Table 1, a=2.5%, b=15 times, C1=12%, C2=5%, and C3=3%. As is clear from Table 1, for first and second times of each of the subjects C and D whose initial PERCLOS was less than 2.5%, with the related art in which the threshold value was set to 12% uniformly, the drowsiness could not be detected even if drowsiness was felt. With respect to this, it was found that the drowsiness detection device 1 according to the first embodiment could detect the drowsiness at the second time of the subject C and formed, the threshold value of the drowsiness detection may be reset, or after the start of driving, the threshold value may be remeasured every certain time period, and the threshold value may be updated when there is a change.

According to the embodiments described above, the certain time period Ta for calculating the PERCLOS is the same as the certain time period Ta for calculating the number of times of blinking, but the present invention is not limited thereto, and the two may be different time periods.

Here, characteristics of the embodiments of the drowsiness detection device and the drowsiness detection method according to the present invention described above will be briefly summarized and listed in [1] to [6] below. [1] A drowsiness detection device (1), including:
- an imaging unit (2) configured to image a face of a detection target person;
- a first calculation unit (33) configured to calculate, based on an image imaged by the imaging unit (2), a drowsiness index value that is a time period during which the detection target person closes an eye within a first predetermined time period or a value according to the time period;
- a drowsiness detection unit (34) configured to detect drowsiness of the detection target person in a case in which the drowsiness index value is equal to or larger than a threshold value; and a threshold value setting unit (35) configured to set the threshold value based on an initial drowsiness index value calculated first after a predetermined trigger.

According to the configuration of the above [1], the threshold value suitable for the driver can be set, and the detection accuracy of drowsiness can be improved.

[2] The drowsiness detection device (1) according to [1], in which
- the threshold value setting unit (35) is configured to set the threshold value to be smaller in a case in which the initial drowsiness index value is less than a predetermined value than in a case in which the initial drowsiness index value is equal to or larger than the predetermined value.

According to the configuration of the above [2], the person who has a small number of times of blinking or performs shallow blinking has an initial drowsiness index value that is less than the predetermined value, and thus the threshold value can be set to be smaller than the threshold value corresponding to the person who blinks generally. Accordingly, the threshold value suitable for the driver can be set, and the detection accuracy of drowsiness can be further improved.

[3] The drowsiness detection device (1) according to [1], further including:
- a second calculation unit (36) configured to calculate, based on an image imaged by the imaging unit (2), the number of times of blinking of the detection target person within a second predetermined time period, in which
- the threshold value setting unit (35) is configured to set the threshold value based on the initial drowsiness index value and an initial number of times of blinking calculated first after the predetermined trigger.

According to the configuration of the above [3], the threshold value suitable for the driver can be set, and the detection accuracy of drowsiness can be further improved.

[4] The drowsiness detection device (1) according to [3], in which
- the threshold value setting unit (35) is configured to
  - set the threshold value to be smaller in a case in which the initial drowsiness index value is less than a predetermined value than in a case in which the initial drowsiness index value is equal to or larger than the predetermined value, and
  - set the threshold value to be smaller in a case in which the initial drowsiness index value is less than the predetermined value and the initial number of times of blinking calculated first after the predetermined trigger is less than a predetermined number of times than in a case in which the initial drowsiness index value is less than the predetermined value and the initial number of times of blinking is equal to or larger than the predetermined number of times.

According to the configuration of the above [4], a person who has a small number of times of blinking belongs to those whose number of times of blinking is less than the predetermined number of times, and the threshold value can be set to be smaller as compared with a person who has a large number of times of blinking. Accordingly, the detection accuracy of drowsiness can be further improved.

[5] The drowsiness detection device (1) according to any one of [1] to [4], in which
- a detection of a start of driving is the predetermined trigger.

According to the configuration of the above [5], the threshold value can be determined based on an initial drowsiness index value close to that in the case of awakening, and the detection accuracy of drowsiness can be further improved.

[6] A drowsiness detection method comprising:
- a first calculation step for calculating, based on an image of a face of a detection target person imaged by an imaging unit (2), a drowsiness index value that is a time period during which the detection target person closes an eye within a first predetermined time period or a value according to the time period;
- a drowsiness detection step (34) for detecting drowsiness of the detection target person in a case in which the drowsiness index value is equal to or larger than a threshold value; and
- a threshold value setting step (35) for setting the threshold value based on an initial drowsiness index value calculated first after a predetermined trigger.

According to the configuration of the above [6], the threshold value suitable for the driver can be set, and the detection accuracy of drowsiness can be improved.

What is claimed is:

1. A drowsiness detection device comprising:
   an imaging unit configured to image a face of a detection target person;
   a first calculation unit configured to calculate, based on an image imaged by the imaging unit, a drowsiness index value that is a time period during which the detection target person closes an eye within a first predetermined time period or a value according to the time period;
   a drowsiness detection unit configured to detect drowsiness of the detection target person in a case that the drowsiness index value is equal to or larger than a threshold value;
   a threshold value setting unit configured to set the threshold value based on an initial drowsiness index value calculated first after a predetermined trigger; and
   a second calculation unit configured to calculate, based on an image imaged by the imaging unit, the number of times of blinking of the detection target person within a second predetermined time period, wherein
   the threshold value setting unit is configured to set the threshold value based on the initial drowsiness index value and an initial number of times of blinking calculated first after the predetermined trigger.

2. The drowsiness detection device according to claim 1, wherein
   when the initial drowsiness index value is less than a predetermined value, the threshold value setting unit is configured to set the threshold value to be smaller than in a case that the initial drowsiness index value is equal to or larger than the predetermined value.

3. The drowsiness detection device according to claim 1, wherein the threshold value setting unit is configured to set the threshold value to be smaller than in a case that the initial drowsiness index value is equal to or larger than the predetermined value when the initial drowsiness index value is less than a predetermined value, and set the threshold value to be smaller than in a case that the initial drowsiness index value is less than the predetermined value and the initial number of times of blinking is equal to or larger than the predetermined number of times when the initial drowsiness index value is less than the predetermined value and the initial number of times of blinking calculated first after the predetermined trigger is less than a predetermined number of times.

4. The drowsiness detection device according to claim 1, wherein a detection of a start of driving is the predetermined trigger.

5. A drowsiness detection method comprising:

calculating, based on an image of a face of a detection target person imaged by an imaging unit, a drowsiness index value that is a time period during which the detection target person closes an eye within a first predetermined time period or a value according to the time period;

detecting drowsiness of the detection target person in a case in which the drowsiness index value is equal to or larger than a threshold value;

setting the threshold value based on an initial drowsiness index value calculated first after a predetermined trigger; and calculating, based on an image imaged by the imaging unit, the number of times of blinking of the detection target person within a second predetermined time period, wherein in the setting the threshold value, the threshold value based on the initial drowsiness index value and an initial number of times of blinking calculated first after the predetermined trigger is set.

\* \* \* \* \*